July 6, 1926.
C. T. DUNHAM
1,591,477
NUT LOCK
Filed Oct. 12, 1925
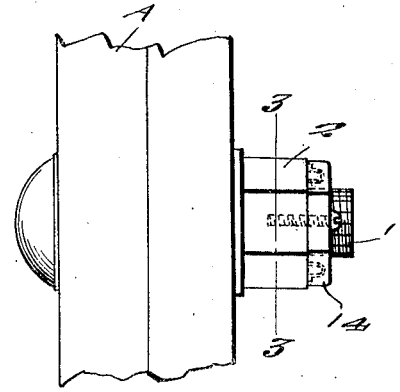
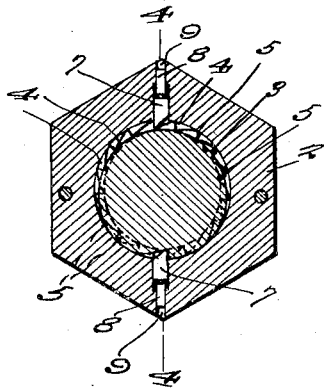
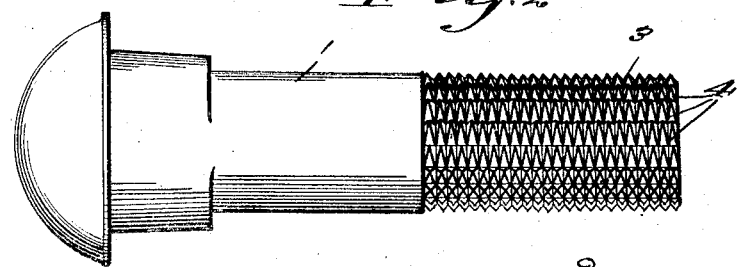
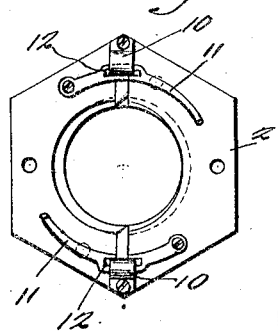
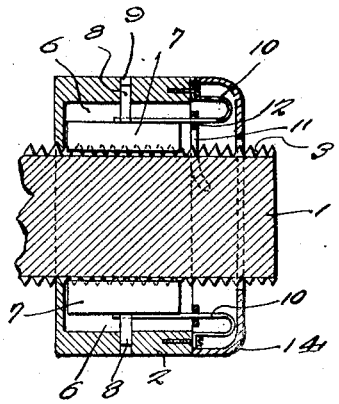
C. T. Dunham, INVENTOR
BY Victor J. Evans, ATTORNEY
WITNESS:

Patented July 6, 1926.

1,591,477

UNITED STATES PATENT OFFICE.

CLAYTON THOMAS DUNHAM, OF NEW YORK, N. Y., ASSIGNOR OF ONE-HALF TO ROBERT P. BARNSWELL, OF NEW YORK, N. Y.

NUT LOCK.

Application filed October 12, 1925. Serial No. 62,120.

This invention relates to improvements in lock nuts, the general object of the invention being to provide ratchet means for holding the nut on the bolt against turning movement.

Another object of the invention is to provide manually operated means for rendering the locking means inactive so that the nut can be removed from the bolt.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a side view showing the invention in use.

Figure 2 is an enlarged view of the bolt.

Figure 3 is a section on line 3—3 of Figure 1.

Figure 4 is a section on line 4—4 of Figure 3.

Figure 5 is an end view.

Figure 6 is a similar view but showing the locking means in inoperative position.

In these views, 1 indicates a bolt and 2 the nut which is arranged to engage the threaded end of the bolt to hold an object or objects, as shown at A, in Figure 1, in position. In order to prevent the nut from working loose on the bolt I provide means for locking it against turning movement in a reverse direction, such means consisting of ratchet means. As shown the threaded part 3 of the bolt is grooved longitudinally, as shown at 4, to provide the ratchet teeth 5. A recess 6 is made in the nut and a dog 7 is placed in the recess and is movably held therein by means of a pin 8 on the dog engaging a hole 9 in the nut. A leaf spring 10 is fastened to the nut and has one end entering the recess and connected with the pin 8, the spring being so arranged that it will hold the dog against the teeth 5. As the dog ratchets over the teeth when the nut is being screwed on the bolt the pin will slide in the opening 9 so that the dog is guided in its movement. A curved lever 11 is pivoted to the nut and has a hole 12 therein through which the spring passes so that when the lever is shoved outwardly it will carry the spring with it and thus the dog will be moved out of engagement with the ratchet teeth 5 so that the nut can be unscrewed from the bolt. A pin 13 is placed on the nut for engaging the lever to hold the same in its outward position with the dog out of engagement with the ratchet teeth.

It will thus be seen that I have provided simple means for locking a nut on the bolt with means whereby the locking means can be rendered inoperative to permit the nut to be unscrewed from the bolt.

It is thought from the foregoing description that the advantages and novel features of my invention will be readily apparent.

I desire it to be understood that I may make changes in the construction and in the combination and arrangement of the several parts, provided that such changes fall within the scope of the appended claims. For instance, a number of the dogs can be used instead of one and a cap 14 may be used for enclosing the parts after they have been assembled.

What I claim is:—

1. A lock nut of the class described comprising a bolt having its threaded part grooved longitudinally to form ratchet teeth, a nut having a recess therein, a dog in the recess, guiding means for the dog, a spring fastened to the nut and engaging the dog for holding the same against the teeth on the bolt, a hand lever pivoted to the nut and having an opening therein through which the spring passes and a projection on the nut for holding the lever in its outward position with the dog in inoperative position.

2. A lock nut of the class described comprising a bolt having its threaded part grooved longitudinally to form ratchet teeth, a nut having a recess therein and an opening communicating with the recess, a dog in the recess, a pin on the dog and arranged in said opening, a spring fastened to the nut and engaging the dog for holding the same against the teeth on the bolt, a curved hand lever pivoted to the nut concentric with the bolt opening therein and said lever having an opening therein through which the spring passes and a projection on the nut for holding the lever in its outward position with the dog in inoperative position.

In testimony whereof I affix my signature.

CLAYTON THOMAS DUNHAM.